DOUBLE-BALANCED MODULATOR
Filed Oct. 19, 1961
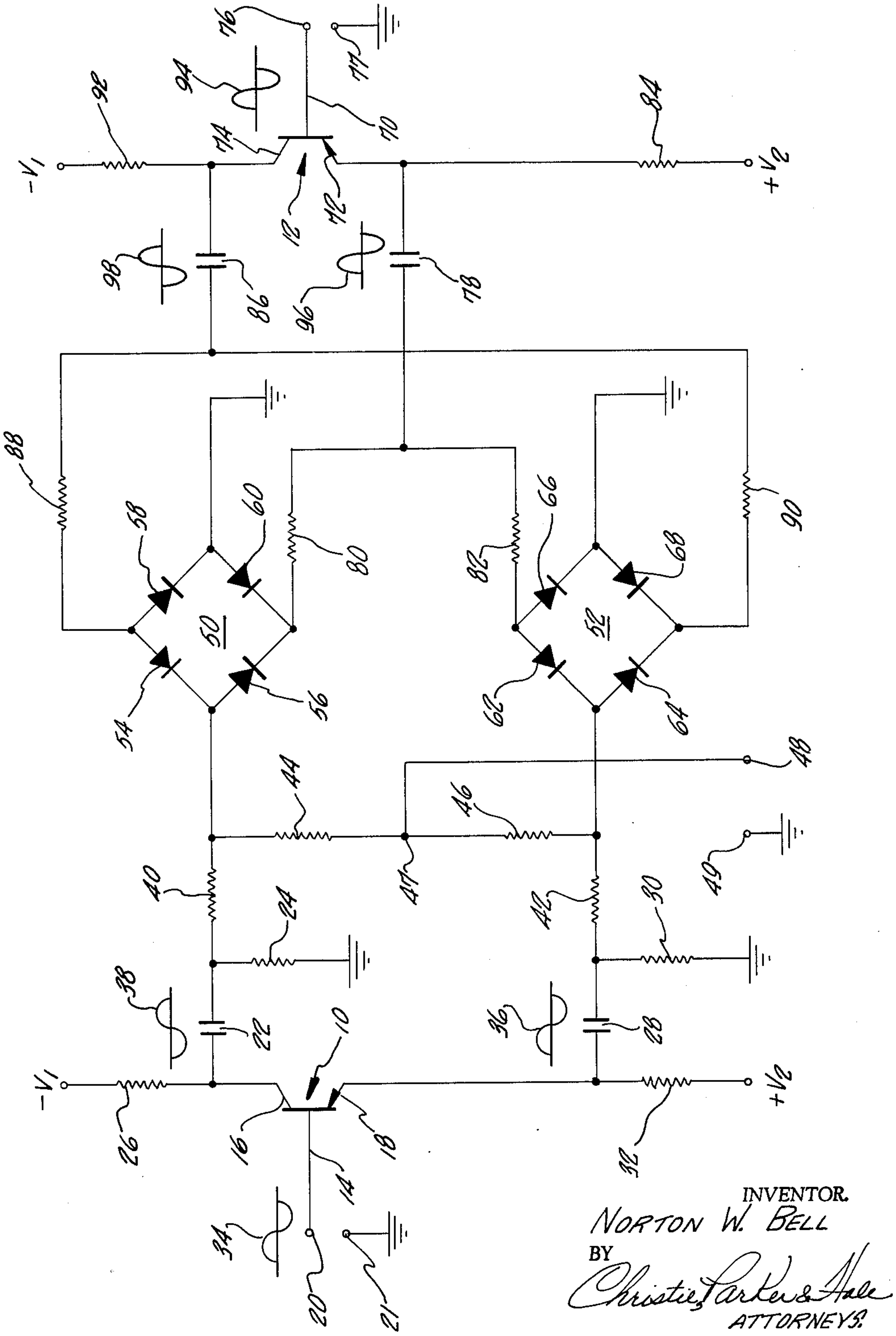
INVENTOR.
NORTON W. BELL
BY
Christie, Parker & Hale
ATTORNEYS.

3,205,457
DOUBLE-BALANCED MODULATOR

Norton W. Bell, Monrovia, Calif., assignor, by mesne assignments, to Bell & Howell Company, Chicago, Ill., a corporation of Illinois
Filed Oct. 19, 1961, Ser. No. 146,170
6 Claims. (Cl. 332—44)

This invention is directed to improvements in electrical signal modulation apparatus and more particularly to a novel transformerless double-balanced signal modulator circuit design.

The term "double-balanced modulator" refers to a class of signal modulators which develop electrical signals to having frequency components corresponding only to multiples of the sum and difference frequency of two alternating input signals. Thus, in response to two alternating current input signals of frequencies S and C, respectively, the double balanced modulator balances out the individual frequencies S and C and develops an output signal including frequency corponents $n_0C \pm n_0S$, where $n_0$ is an odd integer.

Since separate filtering is not required for freqency components corresponding to the input signals opplied thereto, double-balanced modulators find particular use in systems wherein it is desired to develop a signal having a frequency corresponding either to the sum or difference frequency of two separate alternating input current signals. In the past, to produce the necessary frequency balance for the two alternating current input signals, double-balanced modulators generally required the use of two center-tapped transformer, each transformer developing a pair of voltage signals of equal but opposite magnitude. As is commonly known, transformers require an appreciable amount of circuit space and are relatively expensive electrical components. Also, in practice, the frequency range over which a center-tapped transformer develops voltage signals of equal and opposite magnitude to define a frequency balance for the two input signals is rather limited. Thus, double-balanced modulators utilizing center-tapped transformers possess a limited frequency range of linear operation.

In view of the above, the present invention provides a compact, relatively inexpensive, transformerless double-balanced modulator design having an improved range of linear frequency operation.

To accomplish this the present invention, in a basic form, includes first and second input means for receiving first and second alternating current signals, respectively. Coupled between the first input means and a reference point is means for developing a third signal which is a phase-inverted signal version of the first alternating current signal. The first signal is applied to a first impedance means while the third signal is applied to a second impedance means. The first and second impedance means are of equal value and are coupled in series by third and fourth impedance means which are also of equal value. Coupled between a junction of the first and third impedance means and the reference point is a first switching means. Coupled between a junction of the second and fourth impedance means and the reference point is a second switching means. The switching means are responsive to the second alternating current signal to alternately open and close such that the first switching means is open when the second switching means is closed. Coupled between a junction of the third and fourth impedance means and the reference point is an output means.

Normally the first and third signals are applied to the output means through the third and fourth impedance means, respectively. However, due to the alternate opening and closing of the first and second switching means in response to the second alternating current signal, the first and third signals are alternately diverted directly to the reference point. In this manner frequency components corresponding to the individual frequencies of the first and second alternating current signals are balanced out or suppressed and an alternating current signal is developed at the output means including frequency components corresponding to the sum and difference frequency of the first and second alternating current signals.

To better understand the features and operation of the transformerless double-balanced modulator design of the present invention reference should be made to the following detailed description which is to be considered with the drawing, the single figure of which is a schematic representation of a preferred embodiment of the double-balanced modulator of the present invention.

As represented in the drawing, the transformerless double-balanced modulator of the present invention may include a pair of transistors such as represented at 10 and 12, respectively. The transistor 10 includes a base 14, a collector 16 and an emitter 18. The base 14 is coupled to a first input means for receiving a first alternating current signal. The first input means includes an input terminal 20 coupled directly to the base 14 and a terminal 21 coupled to a source of reference potential represented as ground—ground defining a reference point for the double-balanced modulator.

The collector 16 of the transistor 10 is coupled to a capacitor 22 which is, in turn, coupled through a resistor 24 to ground. The capacitor 22 and the resistor 24 define a direct current path to ground. The collector 16 is also coupled through a biasing resistor 26 to a source of negative potential $-V_1$.

The emitter 18 of the transistor 10 is coupled to a capacitor 28 which is, in turn, coupled through a resistor 30 to ground. The capacitor 28 and the resistor 30 define a direct current path to ground. The emitter 18 is also coupled to a biasing resistor 32 to a source of positive potential $+V_2$.

Due to the biasing provided by the potential sources $-V_1$ and $+V_2$, the transistor 10 is normally biased to a fully conductive state and functions as a phase-inverter for the first alternating current signal applied to the first input means. In response to a first alternating current signal such as graphically represented at 34, an in-phase signal variation, represented graphically at 36, is developed at the emitter 18, while a 180° (degrees) out-of-phase signal variation, such as represented at 38, is developed at the collector 16. Further, by proper proportioning the values of the electrical components thus far described, the signals represented by the waveforms 34, 36, and 38 are of equal magnitude. Thus, the phase-inverter including the transistor 10 defines transformerless means for developing two alternating current signals of equal magnitude which are out-of-phase with each other relative to the reference point, i.e. ground.

Coupled in series with the capacitor 22 is a first impedance means represented by the resistor 40. Coupled in series with the capacitor 28 is a second impedance means represented by a resistor 42. The first and second impedance means are of equal value. Coupled in series between the resistor 40 and the resistor 42 are third and fourth impedance means represented by a resistor 44 and a resistor 46, respectively. The third and fourth impedance means are also of equal value.

Coupled to a junction 47 of the third and fourth impedance means is a terminal 48. The terminal 48, together with a terminal 49 which is coupled to ground, define an output means for the double-balanced modulator of the present invention.

Due to the series connection of the first, second, third and fourth impedance means, a signal corresponding in phase to the first alternating current signal is applied through the second and fourth impedance means to the output means while a signal corresponding to a phase-inverted signal version of the first alternating current signal is applied through the first and third impedance means to the output means. Since the first and second impedance means as well as the third and fourth impedance means are of equal value, respectively, voltage signals of like magnitude are developed at the output means in response to these in-phase and out-of-phase current signals.

As briefly described above, to produce the desired balanced modulation, the present invention includes a first switching means coupled between a junction of the first and third impedance means and the reference point and a second switching means coupled between a junction of the second and fourth impedance means and a reference point. The switching means may be electrical switches including tubes, transistors, diodes, or other electrical switching components or may include metallic contacts which are electro-mechanically operated. By way of example only, the first and second switching means included in the preferred embodiment of the present invention comprise a diode ring 50 coupled between a junction of the resistors 40 and 44 and ground and a diode ring 52 coupled between a junction of the resistors 42 and 46 and ground.

The diode ring 50 includes four similar diodes 54, 56, 58 and 60. The diodes 54 and 56 are coupled in series and are in parallel with the diodes 58 and 60 which are also coupled in series. A junction of the diodes 54 and 56 is coupled to a junction of the resistors 40 and 44 while a junction of the diodes 58 and 60 is coupled to ground.

The diode ring 52 includes four similar diodes 62, 64, 66 and 68. The diodes 62 and 64 are coupled in series and are in parallel with the diodes 66 and 68 which are also coupled in series. A junction of the diodes 62 and 64 is coupled to a junction of the resistors 42 and 46 while a junction of the diodes 66 and 68 is coupled to ground.

As briefly described above, the first and second switching means comprising the diode rings 50 and 52, respectively, are alternately closed and opened in response to a second alternating current signal such that one switch is open while the other switch is closed. This is accomplished by alternately biasing the diode rings 50 and 52 to a low resistance an a high resistance state, respectively. To provide such operation in response to a second alternating current signal, the diode rings 50 and 52 are coupled to a second input means through the transistor 12.

As represented, the transistor 12 includes a base 70, an emitter 72, and a collector 74. The base 70 is coupled to the second input means which includes an input terminal 76 coupled directly to the base 70 and a terminal 77 coupled to ground.

The emitter 72 of the transistor 12 is coupled to a capacitor 78. The capacitor 78 is coupled to a junction of the pair of resistors 80 and 82. The resistor 80 is coupled to a junction of the diodes 56 and 60 while the resistor 82 is coupled to a junction of the diodes 62 and 66. In this manner the capacitor 78, together with the resistors 80 and 82, provide alternate direct current signal paths to ground through the diodes 60 and 66, respectively. The emitter 72 is also coupled through a biasing resistor 84 to a source of positive potential $+V_2$.

The collector 74 of the transistor 12 is coupled through a capacitor 86 to a junction of a pair of resistors 88 and 90. The resistor 88 is coupled to a junction of the diodes 54 and 58 while the resistor 90 is coupled to a junction of the diodes 64 and 68. In this manner the capacitor 86, in combination with the resistors 88 and 90, provides alternate direct current signal paths to ground through the diodes 58 and 68, respectively. The collector 74 of the transistor 12 is also coupled through a biasing resistor 92 to a source of negative potential $-V_1$.

Due to the biasing provided by the potential sources $+V_2$ and $-V_1$, the transistor 12 is normally biased to a fully conductive state and functions as a phase-inverter to develop a signal which is a phase-inverted signal version of the second alternating current signal applied to the second input means. In particular, as represented graphically by the waveforms 94, 96 and 98, in response to a second alternating current signal applied to the base 70 of the transistor 12 (graphically represented at 94) a signal is produced at the emitter 72 (graphically represented at 96) which is in-phase with the second alternating current signal. Also in response to the second alternating current signal a signal (graphically represented at 98) is developed at the collector 74 which is 180° (degrees) out-of-phase with the second alternating current signal. Thus the phase-inverter including the transistor 12 defines means for developing two alternating current signals which are out-of-phase with each other relative to the reference point.

As represented, a signal in-phase with the second alternating current signal is applied to a junction of the diodes 62 and 66 and to a junction of the diodes 56 and 60 through the resistors 82 and 80, respectively, simultaneously with an out-of-phase signal being applied to a junction of the diodes 54 and 58 and a junction of the diodes 64 and 68 through the resistors 88 and 90, respectively.

Preferably the magnitude of the second alternating current signal is substantially greater than the magnitude of the first alternating current signal. Thus, the current signals which are in-phase and out-of-phase with the second alternating current signal provides complete control of the first and second switches to define a "switch-type" modulator operation. Thus, considering the waveforms as represented at 94, 96 and 98, respectively, during a first half-cycle of the second alternating current signal a positive potential is developed at a junction of the diodes 56 and 60 and at a junction of the diodes 62 and 66 while a negative potenial is developed at a junction of the diodes 54 and 58 and at a junction of the diodes 64 and 68.

Due to these potentials during a first half-cycle of the second alternating current signal the diodes included in the diode ring 52 are forward biased to a low resistance state thereby representing a closed switch condition while the diodes included in the diode ring 50 are reverse biased to a high resistance state to define an open switch condition. In this state the junction of the resistors 42 and 46 is effectively coupled to ground. Thus, the current signal in-phase with the first alternating current signal is diverted from the resistor 46 by the closed switch 52 directly to ground while a current signal which is out-of-phase with the first alternating current signal passes through the resistors 40 and 44 to the output means.

During the next half-cycle of the second alternating current signal, the relative polarity of the voltages associated with the diode rings 50 and 52 are reversed. Thus the diodes in the diode ring 50 are biased to a low resistance state to define a closed switch condition while the diodes in the diode ring 52 are reverse biased to a high resistance state to define an open switch condition. In this state the out-of-phase current signal is diverted from the resistor 44 directly through the switch 50 to ground while the in-phase current passes through the resistors 42 and 46 to the output means.

By alternately diverting the current signals which are in-phase and out-of-phase with the first alternating current signal to the reference point an alternating current signal is developed at the output means which includes frequency components corresponding only to multiples of the sum and difference frequencies of the first and second alternating current signals.

Since the double-balanced modulator of the present invention provides the desired balanced output signal without utilizing transformers in its operation the circuit design may be compact and relatively inexpensive. Also, since transistors, diodes and resistors may be chosen having extremely wide linear frequency operating ranges the double-balanced modulator provides an improved range of linear frequency response.

Although the present invention has been described in a preferred form as including transistors 10 and 12 to provide in-phase and 180° out-of-phase current signals which function to control first and second switching means and to produce an output signal including multiples of the sum and difference frequencies of two alternating current input signals, it is to be understood that other means for developing two alternating current signals which are out-of-phase with each other relative to a reference point might be utilized without departing from the scope of the present invention. For example, the transistor 10 might be replaced by a triode arranged as a split-load phase-inverter such that a current signal is developed in the cathode circuit of the tube which is in-phase with the first alternating current signal while a current signal is developed at the anode of the triode which is 180° out-of-phase with the first alternating current signal. Further, since triodes may be chosen having a wide linear frequency operating range the double-balanced modulator of the present invention, including vacuum tubes, also provides an improved range of frequency operations.

What is claimed is:

1. A modulator comprising: means coupled to a common reference potential point for developing first and second alternating current signals which are out-of-phase with each other relative to the reference point; first and second impedance means of equal value; third and fourth impedance means of equal value coupled in series with the first and second impedance means; a first switching means coupled between a junction of the first and third impedance means and the reference point; a second switching means coupled between a junction of the second and fourth impedance means and the reference point; means for alternately opening and closing the first and second switching means such that the first switching means is open when the second switching means is closed; means connecting opposite ends of the series connected impedances across the voltage developing means such that the voltage across the series impedances is the sum of the first and second alternating voltage signals; and output means including a first output terminal coupled to a junction of the third and fourth impedance means and a second output terminal coupled to the reference point.

2. A modulator comprising: a first means coupled to a common reference potential point for developing first and second alternating current signals which are out-of-phase with each other relative to the reference point; a second means coupled to the reference point for developing third and fourth alternating current signals which are out-of-phase with each other relative to the reference point; first and second impedance means of equal value; means for applying the first signal to the first impedance means; means for applying the second signal to the second impedance means; third and fourth impedance means of equal value coupled in series with the first and second impedance means; a first electrical switching means coupled between a junction of the first and third impedance means and the reference point; a second electrical switching means coupled between a junction of the second and fourth impedance means and the reference point; means for applying the third signal to the first switching means to alternately open and close the first switching means; means for applying the fourth signal to the second switching means for alternately opening and closing the second switching means such that the second switching means is open when the first switching means is closed; and output means including a first output terminal coupled to a junction of the third and fourth impedance means and a second output terminal coupled to the reference point.

3. A modulator comprising: input means for receiving a first alternating current signal; means coupled between the input means and a common reference potential point for developing a second alternating current signal which is a phase-inverted signal version of the first alternating current signal; first and second impedance means of equal value; means for applying the first signal to the first impedance means; means for applying the second signal to the second impedance means; third and fourth impedance means of equal value coupled in series with the first and second impedance means; a first switching means coupled between a junction of the first and third impedance means and the reference point; a second switching means coupled between a junction of the second and fourth impedance means and the reference point; means for alternately opening and closing the first and second switching means such that the first switching means is open when the second switching means is closed; and output means including a first output terminal coupled to a junction of the third and fourth impedance means and a second output terminal coupled to the reference point.

4. A modulator comprising: a first input means for receiving a first alternating current signal; a second input means for receiving a second alternating current signal; means coupled between the first input means and a common reference potential point for developing a third signal which is a phase-inverted signal version of the first alternating current signal; means coupled between the second input means and the reference point for developing a fourth signal which is a phase-inverted signal version of the second alternating current signal; first and second impedance means of equal value; means for applying the first signal to the first impedance means; means for applying the third signal to the second impedance means; third and fourth impedance means of equal value coupled in series with the first and second impedance means; a first electrical switching means coupled between a junction of the first and third impedance means and the reference point; means for applying the second signal to the first switching means to alternately open and close the first switching means; a second switching means coupled between a junction of the second and fourth impedance means and the reference point; means for applying the fourth signal to the second switching means to alternately open and close the second switching means such that the second switching means is open when the first switching means is closed; and output means coupled between a junction of the third and fourth impedance means and the reference point.

5. A modulator demodulator circuit comprising: means connected to a common reference potential point for developing first and second alternating voltage signals which are out-of-phase with each other relative to the reference point; first and second impedance means of equal value coupled in series with each other; output means including a first output terminal coupled to the series junction of the first and second impedance means and a second output terminal connected to the reference point; means connecting opposite ends of the series connected impedances across the voltage developing means such that the voltage across the series impedances is the sum of the first and second alternating voltage signals, and switching means for alternately connecting the opposite ends of the series connected impedances to the reference potential point.

6. A modulator demodulator circuit comprising: a first means connected to a common reference potential point for developing first and second alternating voltage signals which are out-of-phase with each other relative to the reference point; a second means coupled to the reference point for developing third and fourth alternating current signals which are out-of-phase with each other relative to the reference point; first and second impedance means of equal value coupled in series with each other; output means connected between the series junction of the first and second impedance means and the reference point; means connecting opposite ends of the series connected impedances across the voltage developing means such that the voltage across the series impedances is the sum of the first and second alternating voltage signals, and switching means responsive to the third and fourth signals for alternately connecting the opposite ends of the series connected impedances to the reference potential point.

References Cited by the Examiner

UNITED STATES PATENTS

| | | | |
|---|---|---|---|
| 2,569,279 | 9/51 | Barton | 332—47 |
| 2,788,493 | 4/57 | Zawels. | |
| 2,842,744 | 7/58 | Frank | 332—47 |
| 2,888,622 | 5/59 | Mooers. | |
| 3,010,079 | 11/61 | Straube | 332—47 |

ROY LAKE, *Primary Examiner.*

ARTHUR GAUSS, *Examiner.*